US008896150B1

(12) United States Patent
Shammoh

(10) Patent No.: US 8,896,150 B1
(45) Date of Patent: Nov. 25, 2014

(54) MULTI-SOCKET POWER ADAPTER

(71) Applicant: Ali A. A. J. Shammoh, Al-Adan (KW)

(72) Inventor: Ali A. A. J. Shammoh, Al-Adan (KW)

( * ) Notice: Subject to any disclaimer, the term of this patent is extended or adjusted under 35 U.S.C. 154(b) by 0 days.

(21) Appl. No.: 14/223,847

(22) Filed: Mar. 24, 2014

Related U.S. Application Data

(63) Continuation of application No. 14/139,330, filed on Dec. 23, 2013.

(51) Int. Cl.
*H02J 3/00* (2006.01)
*H01R 29/00* (2006.01)
*H01R 27/00* (2006.01)
*H01R 13/40* (2006.01)
*H01R 33/00* (2006.01)

(52) U.S. Cl.
CPC ........................................ *H02J 3/00* (2013.01)
USPC ............. 307/31; 439/106; 439/171; 439/222; 439/590; 439/653

(58) Field of Classification Search
USPC ............. 307/31; 439/106, 171, 222, 590, 653
See application file for complete search history.

(56) References Cited

U.S. PATENT DOCUMENTS 5,700,150 A 12/1997 Morin
5,848,907 A 12/1998 Chen
6,062,884 A 5/2000 Messimer et al.
6,077,109 A 6/2000 Prazoff
6,087,587 A 7/2000 Gonzalez
6,346,006 B1 2/2002 Smith
6,923,667 B1 8/2005 Chen
7,273,384 B1 9/2007 So
7,381,067 B2 6/2008 Sze
7,601,023 B1 10/2009 Ma et al.
7,663,866 B2 * 2/2010 Lee et al. ...................... 361/601
7,946,868 B1 5/2011 Chen
2008/0210507 A1 9/2008 Johnson
2010/0173526 A1 7/2010 Chiang et al.

FOREIGN PATENT DOCUMENTS

WO WO 2009/134152 A1 11/2009

* cited by examiner

*Primary Examiner* — Hal Kaplan
(74) *Attorney, Agent, or Firm* — Richard C Litman

(57) ABSTRACT

The multi-socket power adapter includes a main housing unit and an extension unit mounted inside the main housing unit. The main housing unit includes a recess for the extension unit. A ribbon cable wound on a spool is housed inside the extension unit. The ribbon cable protrudes through the extension unit into the main housing unit to establish an electrical connection, which allows the extension unit to be used as a conventional extension cord. The extension unit includes a plurality of power plug sockets and a power switch for each plug socket so that power to each socket can be controlled. The main housing unit also includes a power switch and a power consumption monitor.

15 Claims, 11 Drawing Sheets

MULTI-SOCKET POWER ADAPTER

CROSS-REFERENCE TO RELATED APPLICATIONS

This application is a continuation of application Ser. No. 14/139,330, filed Dec. 23, 2013.

BACKGROUND OF THE INVENTION

1. Field of the Invention

The present invention relates to electrical systems, and particularly to a multi-socket power adapter having increased versatility for access to power both at fixed and remote locations, and control of the delivery thereof.

2. Description of the Related Art

Electrical devices are in abundance in everyday life. These range from small, handheld entertainment devices to operational necessities, such as computers, copiers, printers and the like. All require periodic or continuous attachment to a power source through a wall outlet. Although numerous and prevalent, most households or buildings do not have the electrical outlets to accommodate these various devices.

One common solution to the above is extension cords. These are usually constructed as an elongate cord of predetermined, fixed length having an adapter end with one or more sockets. While useful, the typical extension cord limits how far one can extend the power cord, and creates a potential hazard due to unintentional tangling of the cord.

Another common solution includes power strips having a plurality of receptacles. These usually implement a protective power surge mechanism. These are also useful, since they provide the convenience of multiple, additional outlets and added protection features. However, most do not have different socket configurations for different types of electrical devices, or a means of controlling power to individual sockets, especially at a time when energy conservation is a worldwide concern.

In light of the above, it would be a benefit in the art of electrical systems to provide a versatile power adapter having increased adaptability for various electrical devices and locales, and user-control of power availability. Thus, a multi-socket power adapter solving the aforementioned problems is desired.

SUMMARY OF THE INVENTION

The multi-socket power adapter includes a main housing unit and an extension unit mounted inside the main housing unit. The main housing unit includes a recess for the extension unit. A ribbon cable wound on a spool is housed inside the extension unit. The ribbon cable protrudes through the extension unit into the main housing unit to establish an electrical connection, which allows the extension unit to be used as a conventional extension cord. The extension unit includes a plurality of power plug sockets having a power switch for each plug socket so that power to each socket can be controlled. The main housing unit also includes a power switch and means for monitoring power consumption.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
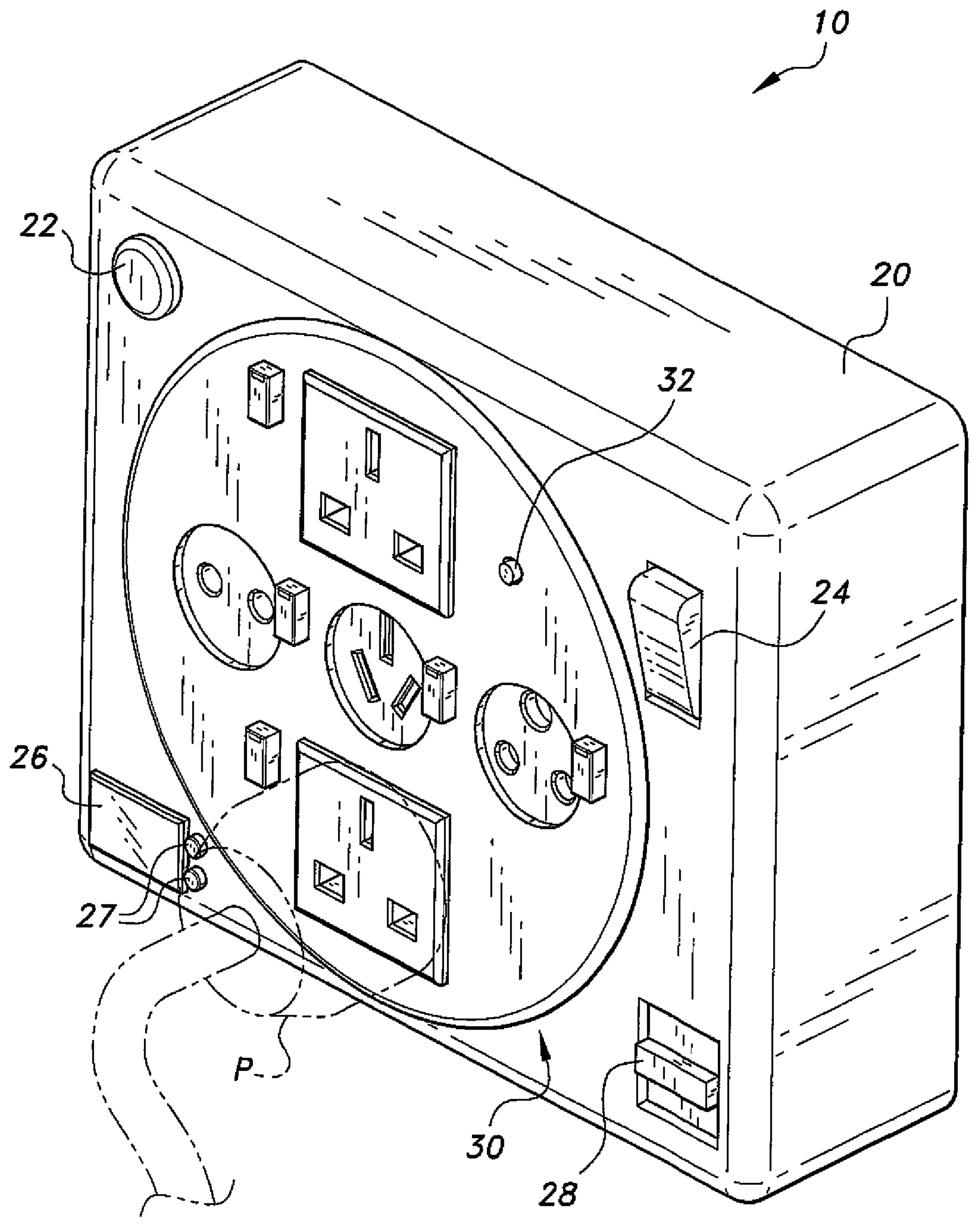
FIG. 1 is an environmental, perspective view of a multi-socket power adapter according to the present invention.
Figure 2:
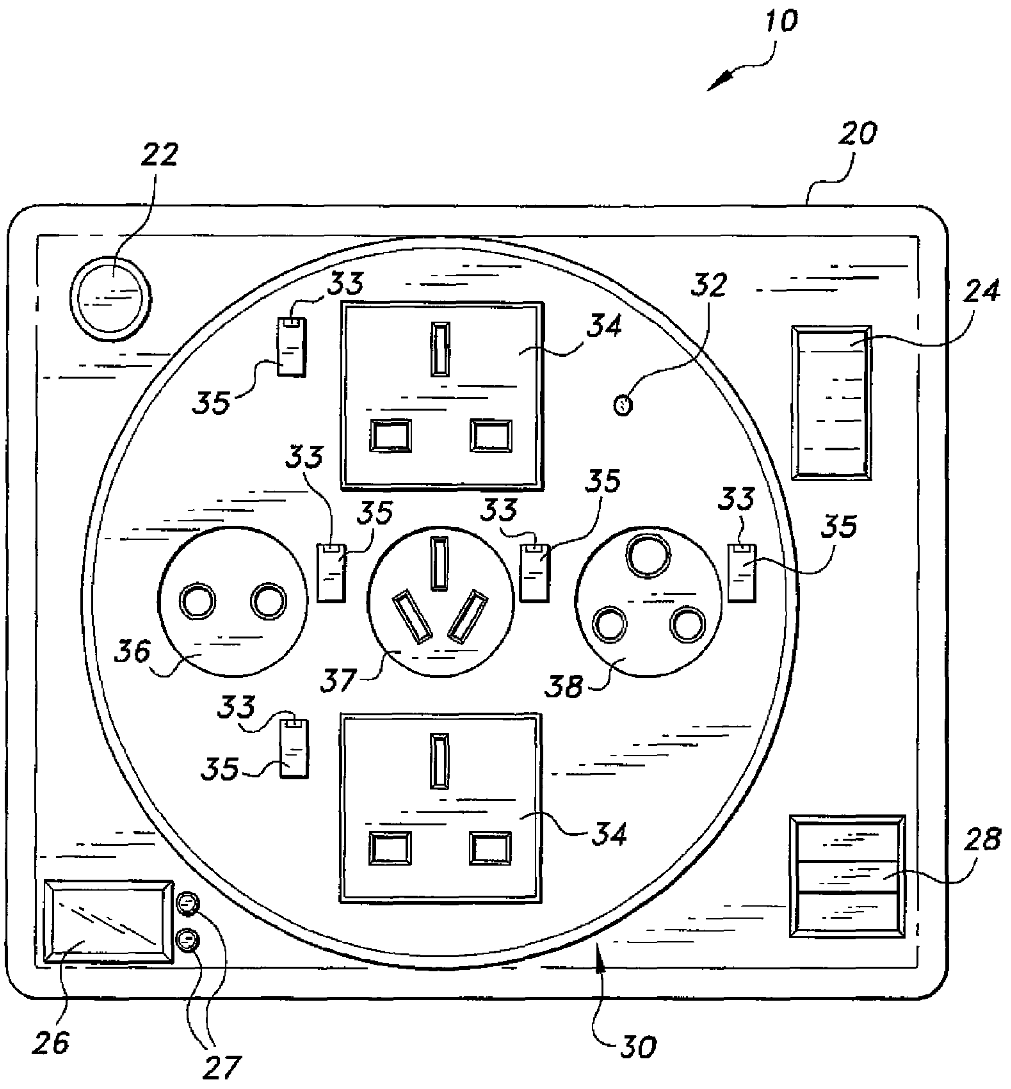
FIG. 2 is a front view of the multi-socket power adapter of FIG. 1.
Figure 3:
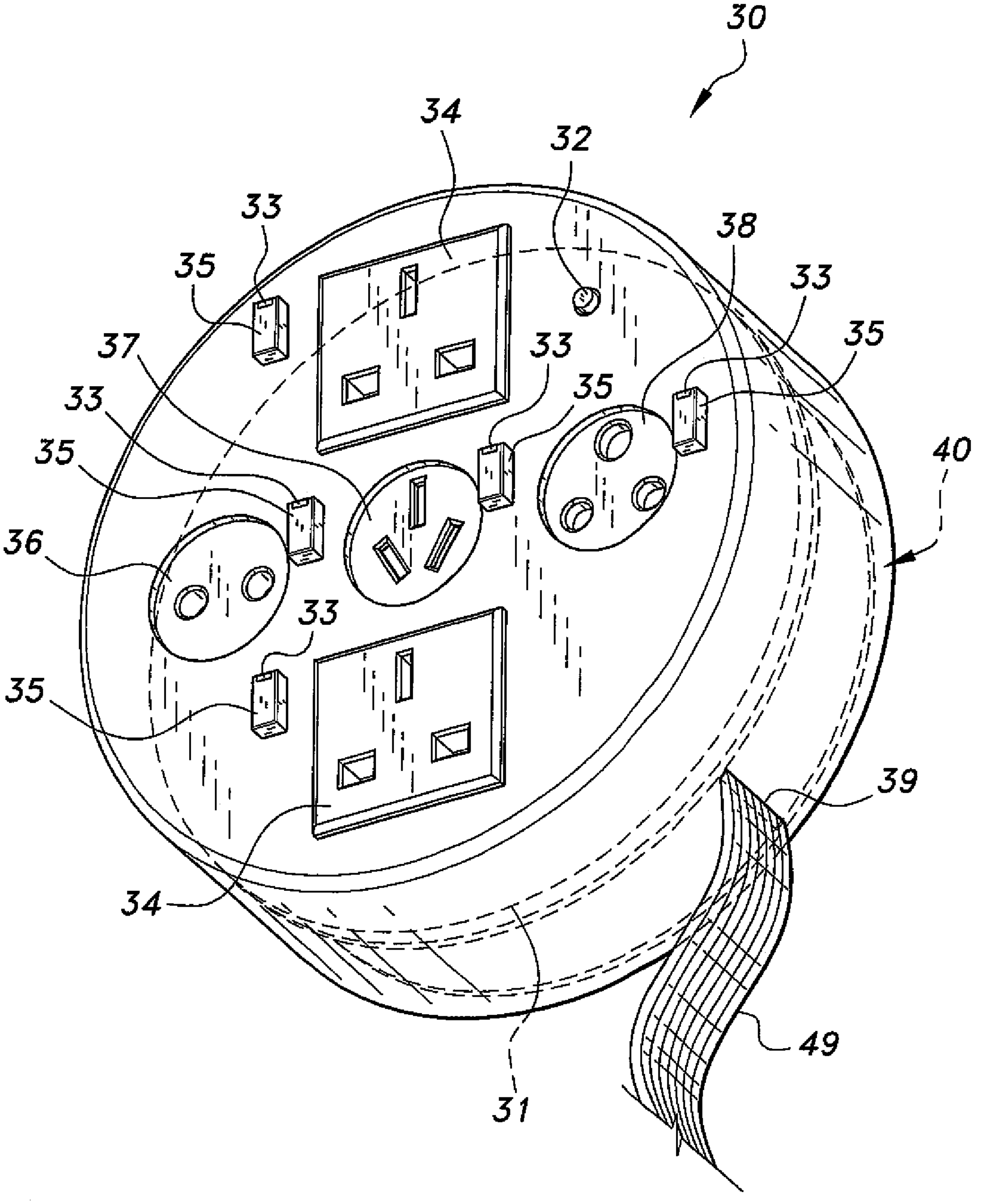
FIG. 3 is a perspective view of the extension unit component of the multi-socket power adapter of FIG. 1.

The multi-socket power adapter, generally referred to by the reference number 10 in the drawings, provides a versatile power outlet for practically any locale and has features for monitoring and controlling the amount of energy consumption. As best seen in FIGS. 1-3, the multi-socket power adapter 10 includes a main housing unit 20 and a detachable extension unit or module 30 mounted inside the main housing unit 20. The multi-socket power adapter 10 is configured to be mounted to a wall of a building, much like conventional wall outlets, or used as a discrete adapter for plugging into a conventional outlet.

The main housing unit 20 is preferably a rectangular, block-shaped housing with monitoring and control features integrated therein. The dimensions of the main housing unit 20 are preferably about 25 cm (length)×20 cm (height)×10 cm (thick). The face of the main housing unit 20 includes a button latch 22 on the upper left-hand corner. The button latch 22 facilitates selective locking engagement of the extension unit 30, such as by conventional hook latch or spring latch mechanisms known in the art. A power switch 24 is disposed on the upper right-hand corner, which facilitates selective powering of the multi-socket power adapter 10. This is one of several means for controlling energy consumption and allows the user to activate power whenever required, rather than having the power constantly ON, which leads to waste. The extension unit 30 includes an LED (light emitting diode) indicator light 32 that turns on or off in response to activation or deactivation of the power switch 24. The indicator light 32 can be configured to emit any desired color, e.g., red for power on state.

The lower left-hand portion of the face includes a display screen 26 and buttons 27 for controlling the information displayed on the screen 26. The screen 26 is preferably a LCD (liquid crystal display) screen, which is a ubiquitous and inexpensive option for constructing a display. Moreover, LCD screens can be easily configured to display in monochrome or color. The information displayed thereon can include the amount of electricity consumed over a given period, temperature, and other data to help users monitor their own energy consumption and habits. The data to be displayed can be supplied by a monitoring module 14 mounted inside the main housing unit 20 behind the display screen 26. The monitoring module 14 can include sensors for generating the desired data.

In some unfortunate circumstances, power can be shut off due to unforeseen surges or other complications, e.g., a potential short circuit during lightning storms. In order to compensate, the main housing unit 10 includes a circuit breaker switch 28 on the lower right-hand corner of the face. As an alternative, all of the above switches, screen and buttons can be located anywhere on the main housing 20, so long as they can be easily accessed by the user.

The extension unit or module 30 functions as an integrated extension cord having a plurality of plug sockets and control features. As best shown in FIG. 3, the extension unit 30 is a cylindrical disc having a plurality of plug sockets 34, 36, 37, 38 arranged around the face thereof. With the exception of the first and second plug sockets 34, the remaining third, fourth and fifth plug sockets 36, 37, 38 accommodate plugs of different configurations. Thus, it can be seen that different standards of plugs can be accommodated by the multi-socket power adapter 10. In addition, any combination of configurations for the plug sockets can be implemented into the extension unit 30. The dimensions of the extension unit 30 are preferably about 18 cm (diameter) and 9 cm (thick).

Each plug socket 34, 36, 37, 38 includes a corresponding power switch 35 adjacent the plug socket. Each power switch 35 also includes an LED indicator light 33 to display the ON or OFF state for the corresponding plug socket 34, 36, 37, 38. This is an additional level of control and allocation of power use that helps to prevent energy waste by only activating power to the plug socket being used.

Figure 4:
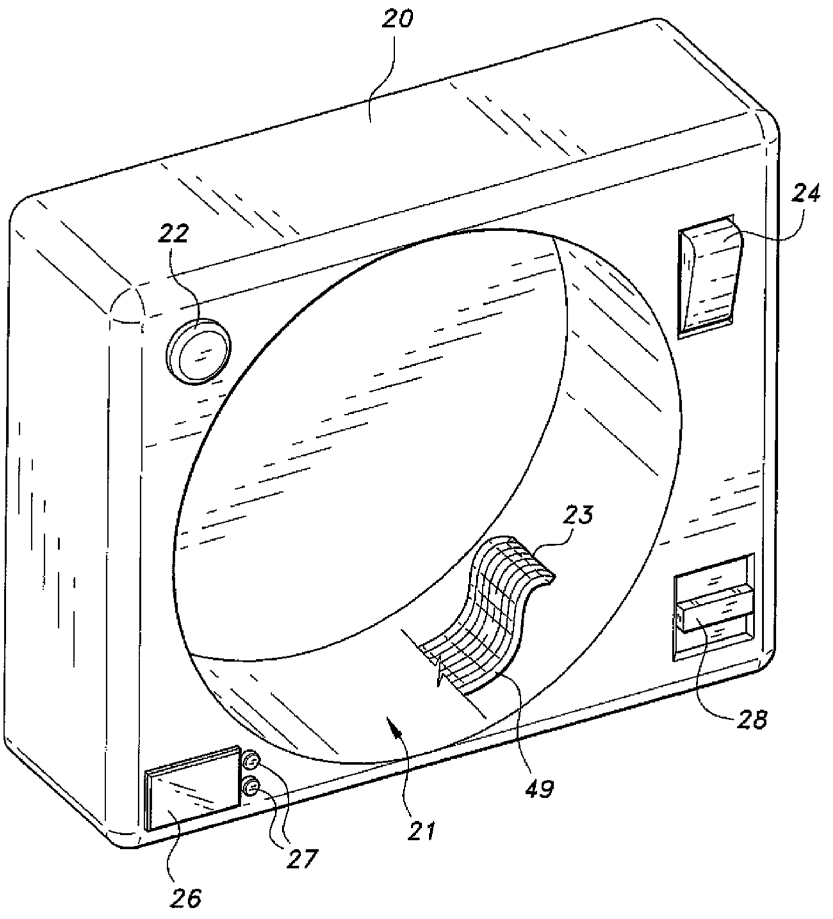
FIG. 4 is a perspective view of the main housing unit for the multi-socket power adapter of FIG. 1, the extension unit being omitted.

In order to permit the extension unit 30 to be used as an extension cord, the extension unit 30 includes a flat or ribbon cable 49 spooled inside the extension unit 30. The ribbon cable 49 extends out of a slot 39 on the extension unit 30 and connects to the main housing unit 20 through a corresponding slot 23. As best seen in FIG. 4, the main housing unit 20 includes a circular recess 21 that accommodates selective insertion of the extension unit 30 therein. The slot 23 is formed on the interior wall of the recess 21. The ribbon cable 49 can be permanently connected to the main housing unit 20, or may be detachably mounted via a separate plug. The power for the multi-socket power adapter 10 is supplied by the power module 12 located inside the main housing unit 20. The power module 12 may include connectors 13 for attaching household or building power lines thereon.

In use, the extension unit 30 can be removed from the main housing unit 20 by pressing the button latch 22. Then the extension unit 30 can be pulled away from the main housing unit 20 to a desired distance, a select plug socket 34, 36, 37, 38 can be powered on by a respective power switch 35, and a plug P of an electrical device inserted into the select plug socket 34, 36, 37, 38. The ribbon cable 49 may be any desired length, but is preferably about 25 m long.

Figure 5:
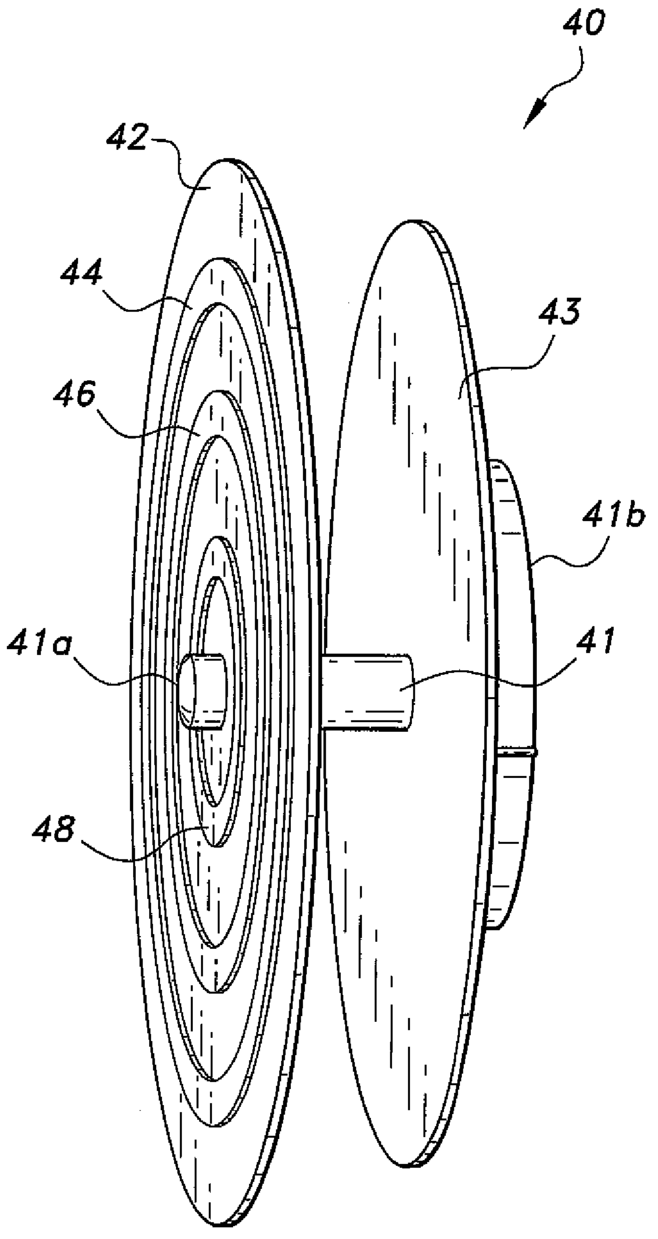
FIG. 5 is a perspective view of the spool inside the extension unit of FIG. 3.
Figure 6:
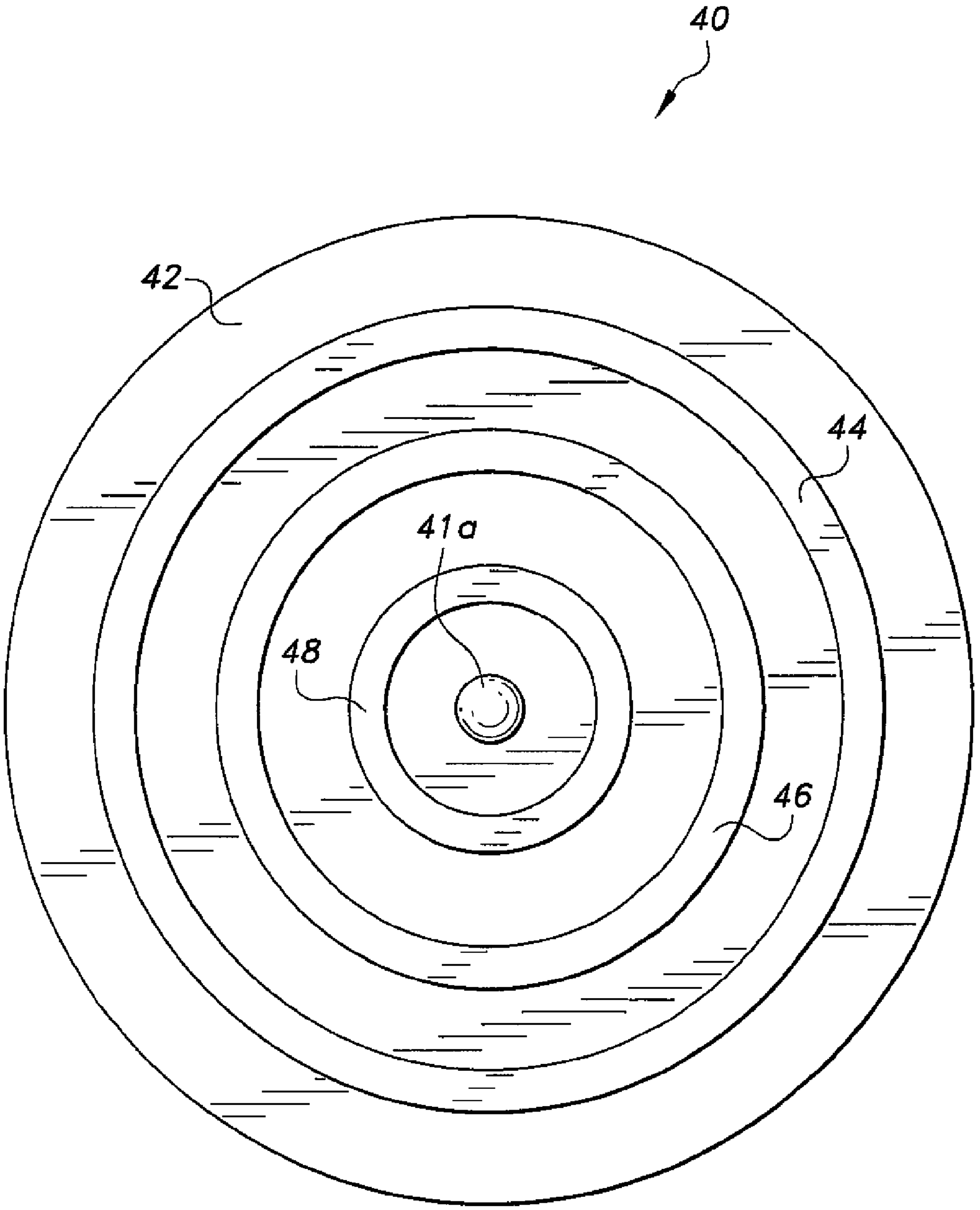
FIG. 6 is a front view of the spool of FIG. 5.
Figure 10:
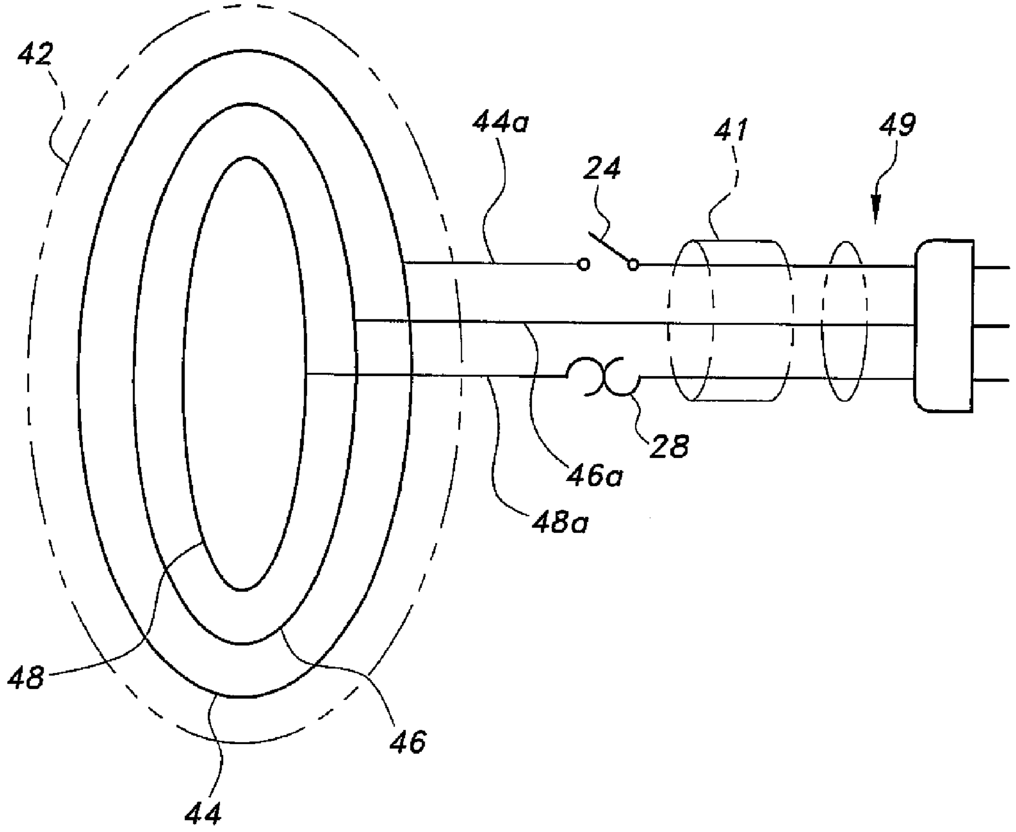
FIG. 10 is a schematic drawing of the lines supplying power to the conductor rings through the spool according to the present invention.
Figure 11:
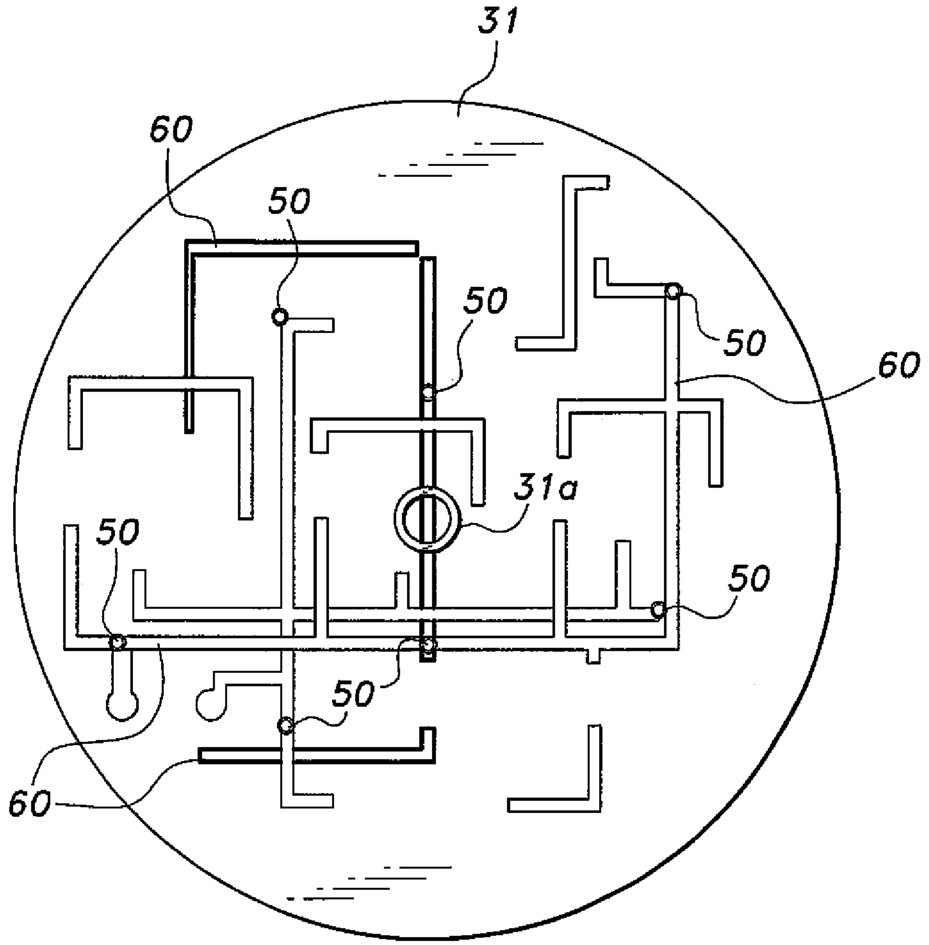
FIG. 11 is a rear view of the partition panel with a circuit for conducting power to the sockets according to the present invention.

As best shown in FIGS. 5 and 6, the ribbon cable 49 is wound around a spool 40 contained inside the extension unit 30. The extension unit 30 is thick enough to accommodate the prongs of the plugs P, as well as the spool 40. The interior of the extension unit 30 is preferably axially divided by a partition panel 31 to segregate the prong section from the spool section. The partition panel 31 serves as a printed circuit board, the details of which will be further described below. The spool 40 includes a shaft 41, a first annular plate 42 attached to one end of the shaft 41, and a second annular plate 43 attached to the opposite end of the shaft 41. The opposite ends of the shaft 41 are constructed with support pins 41*a* for centering and rotatably supporting the spool 40 within the housing of the extension unit 30. As best seen in FIG. 11, the partition panel 31 can include a socket 31*a* for receiving one of the support pins 41*a*. The spool 40 is preferably configured as a self-winding element or component, such as via a torsion spring 41*b* operatively attached to one of the support pins 41*a*. The first and second plates 42, 43 can be constructed in different diameters, as shown, or the same diameter. In order to facilitate transmission of electricity to the socket plugs 34, 36, 37, 38, the first plate 42 includes three concentric, annular conductor rings 44, 46, 48. The first conductor ring 44 is operatively connected to the hot or live line, the second conductor ring 46 is operatively connected to the neutral line, and the third conductor ring 48 is operatively connected to the ground line. As mentioned previously, one end of the ribbon cable 49 is connected to the main housing unit 20, and the other end is connected to the shaft 41. Referring to the schematic drawing shown in FIG. 10, the corresponding live 44*a*, neutral 46*a* and ground 48*a* lines in the ribbon cable 49 are electrically connected to the respective conductor rings 44, 46, 48. Thus, electrical power is conducted from the ribbon cable 49 to the conductor rings 44, 46, 48, so that electricity is available, no matter the rotated position of the spool 40.

Figure 7:
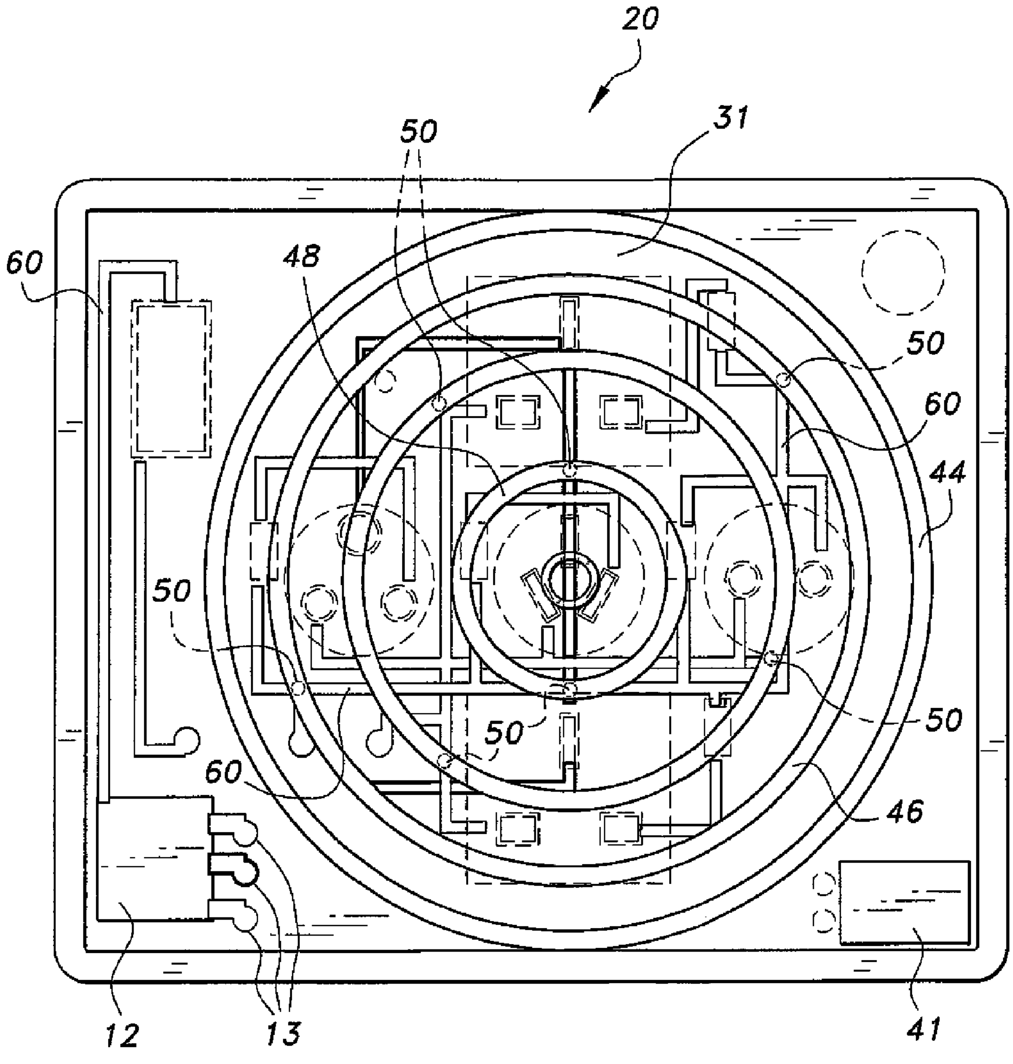
FIG. 7 is a rear view of the multi-socket power adapter of FIG. 1, the cover being omitted to show further details thereof.
Figure 8:
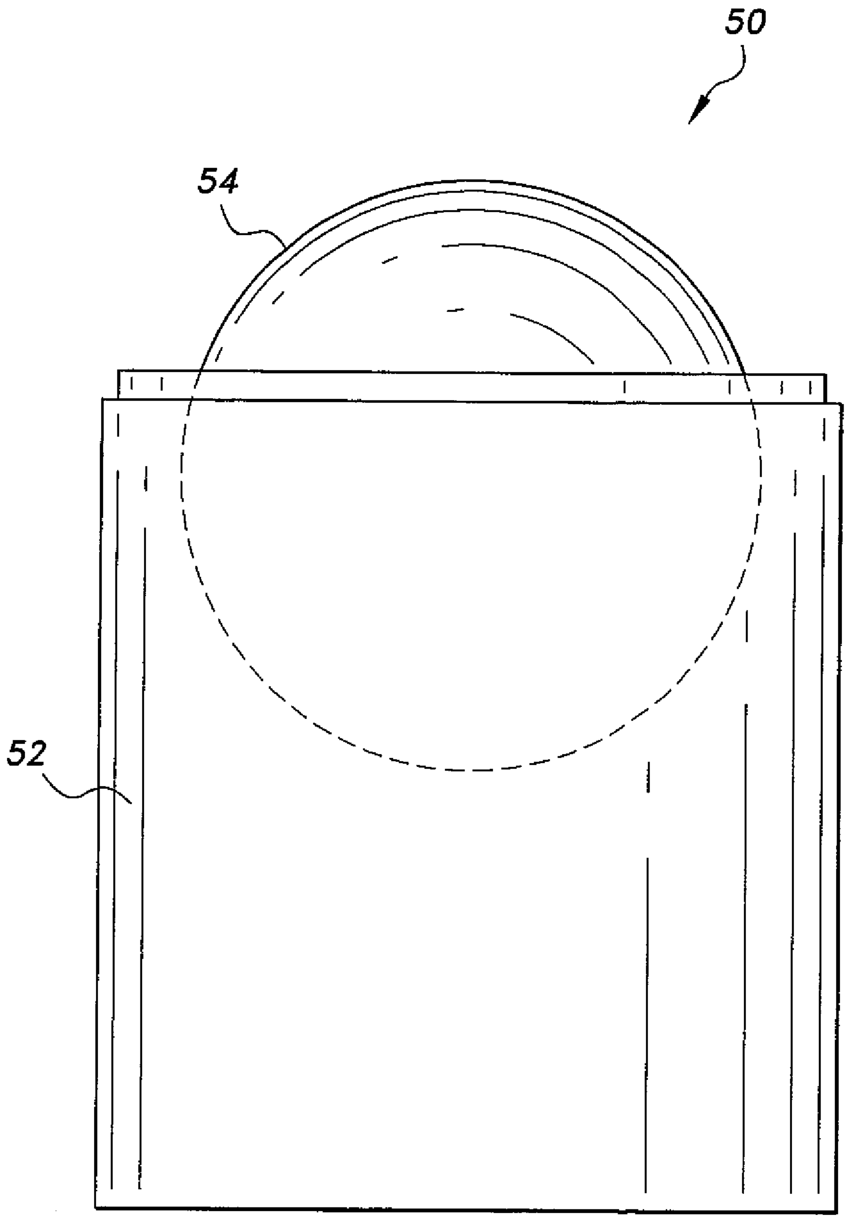
FIG. 8 is a side view of the leads in the multi-socket adapter shown in FIG. 1.

As best shown in FIGS. 7, 8, and 11, the partition panel 31 includes a printed board having a plurality of conductor lines 60 thereon. These conductor lines 60 are electrically connected to the plurality of plug sockets 34, 36, 37, 38. A plurality of ball-point conductors 50 is disposed at select locations on the conductor lines 60 so that the ball-point conductors 50 maintain contact with the conductor rings 44, 46, 48 at all angular positions of the plate 42. Each ball-point conductor 50 includes a cylindrical base 52 and a ball 54 mounted at one end of the base 52. Both the base 52 and the ball 54 are electrically conductive, and the ball 54 is free to rotate on the base 52. In use, the ball-point conductors 50 serve as an electrical bridge between the plug sockets 34, 36, 37, 38, switches 35, indicator light 32, and the annular conductor rings 44, 46, 48. Thus, the ball-point conductors 50 facilitate continuous electrical contact so that the winding and unwinding motion of the spool 40 does not prevent power from transferring to the plug sockets 34, 36, 37, 38.

Figure 9:
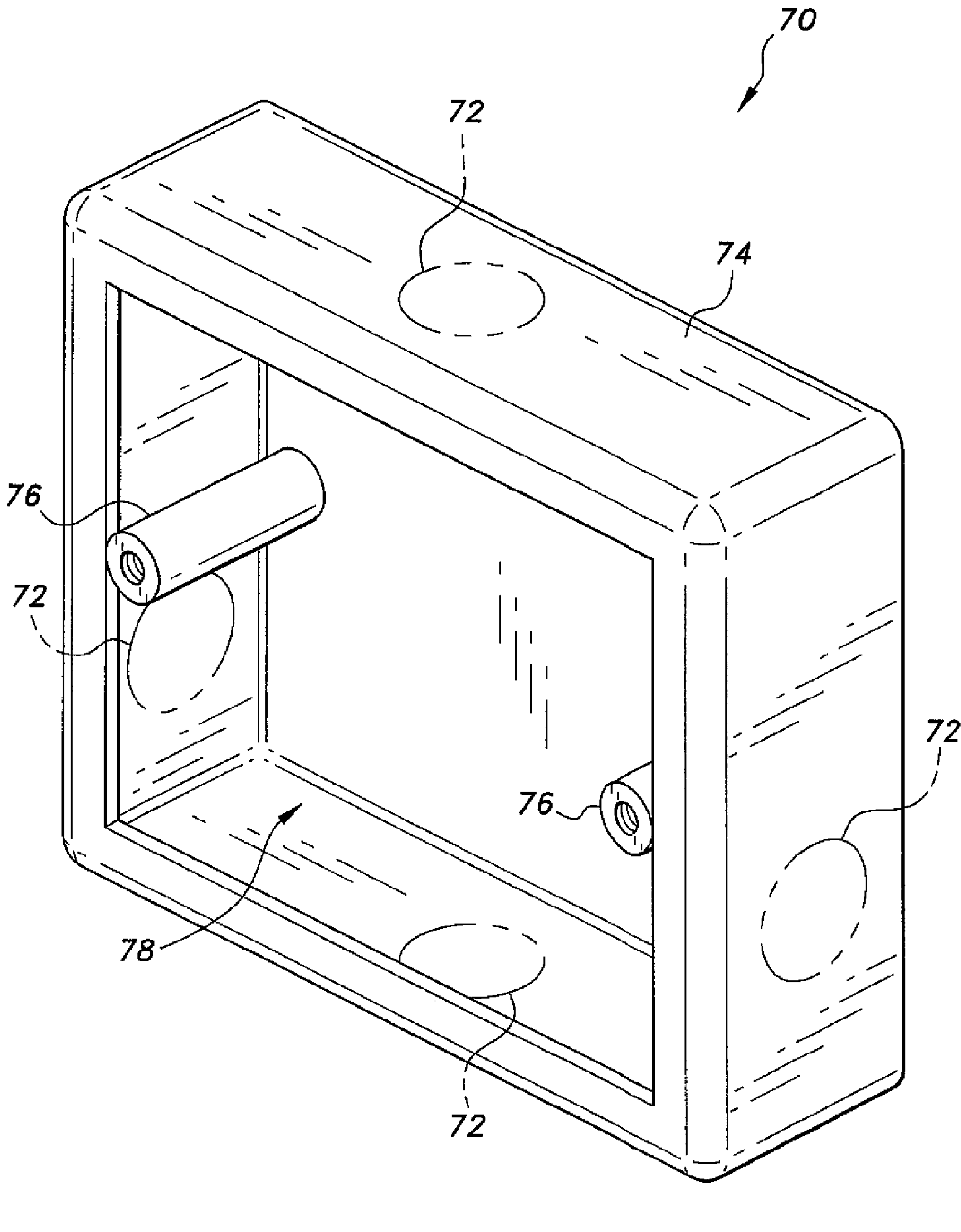
FIG. 9 is a perspective view of a wall mount adapter for the multi-socket adapter shown in FIG. 1.

While the multi-socket power adapter 10 can be used or installed alone as a replacement for conventional electrical wall outlets, the multi-socket power adapter 10 also includes means for easing installation thereof. As best shown in FIG. 9, the multi-socket power adapter 10 can be provided with a wall mount adapter 70. The wall mount adapter 70 can be provided in the form of a substantially open rectangular housing 74 that mounts into a corresponding opening on a wall, either flush or protruding therefrom. The wall mount adapter 70 can include an opening 72 for the wires to thread through, as well as screw holes or bosses 76 and the like to secure the same onto studs or other hardware in or on the wall. The recess 78 in the wall mount adapter 70 can be dimensioned to snugly receive the main housing unit 20 and secured thereto by conventional means, such as screws and the like, via the mounting bosses 76. Alternatively, the wall mount adapter 70 can be dimensioned the same as the main housing unit 20 so that the main housing unit is installed over the recess opening. This provides some room for wire management and protection of the same.

Thus, it can be seen that the multi-socket power adapter 10 provides much versatility and energy-conserving controls. The plurality of plug sockets 34, 36, 37, 38 includes a variety of different plug configurations that accommodate different standards, and each socket 34, 36, 37, 38 includes the power switch 35 so that only the plug socket to be used is supplied with power. In addition, the ribbon cable 49 allows the extension unit 30 to be used as a conventional extension cord, increasing the range at which electrical devices can be powered. The power switch 24 and the screen 26 provides greater level of control and monitoring so that users can ascertain power consumption and make informed decisions for future use.

It is to be understood that the present invention is not limited to the embodiments described above, but encompasses any and all embodiments within the scope of the following claims.

I claim:

1. A multi-socket power adapter, comprising:

a main housing unit adapted for connection to a main power source;

a control means for managing power from the main power source, the control means being disposed on the main housing unit;

a monitoring means for determining power consumption, the monitoring means being disposed on the main housing unit;

an extension unit detachably mounted inside the main housing unit, the extension unit having a plurality of plug sockets, control means for managing power for each of the plug sockets, and an extendable ribbon cable connected to the main housing unit, the ribbon cable permitting the extension unit to be placed at a location remote from the main housing unit, thereby extending power availability range for electrical devices; and a button latch mounted to the main housing unit, the button latch selectively locking the extension unit in the main housing unit.

2. The multi-socket power adapter according to claim 1, wherein said main housing unit comprises a box-shaped casing having a recess, said extension unit being removably disposed in the recess, the recess having a slot formed in an interior wall thereof, the ribbon cable having opposing ends, the ribbon cable extending from said main housing unit through the slot.

3. The multi-socket power adapter according to claim 2, wherein said control means for managing power from said main power source comprises:

a power switch mounted on one corner of said main housing unit, the power switch selectively activating power to the multi-socket power adapter; and a circuit breaker switch mounted to another corner of said main housing unit, the circuit breaker switch resetting inadvertent interruption of power to the multi-socket power adapter.

4. The multi-socket power adapter according to claim 3, further comprising an indicator light disposed on said extension unit, the indicator light displaying power active or inactive state in response to said power switch on said main housing unit being switched on and off.

5. The multi-socket power adapter according to claim 2, wherein said monitoring means for determining power consumption comprises:

an LCD display screen mounted to a corner of said main housing unit; and a plurality of buttons adjacent the display screen, the display screen displaying at least power consumption data, the buttons controlling data being displayed on the display screen.

6. The multi-socket power adapter according to claim 2, wherein said extension unit comprises:

a cylindrical case having said plurality of plug sockets and control means for managing power for each of the plug sockets on one face of the case;

a circuit inside the case for directing power to the plug sockets;

a slot disposed on a side of the case, said ribbon cable extending through the slot in the case; and a rotatable spool for selective extension and retraction of said ribbon cable from the case.

7. The multi-socket power adapter according to claim 6, wherein said control means for managing power for each of the plug sockets comprises a power switch adjacent each of the plug sockets, each of the power switches having an indicator light indicating power active or inactive state of the respective plug socket.

8. The multi-socket power adapter according to claim 6, wherein said plurality of plug sockets comprises at least three plug sockets having a different prong configurations from each other.

9. The multi-socket power adapter according to claim 6, wherein said spool comprises a shaft for winding and unwinding said ribbon, a first plate attached to one end of the shaft, and a second plate attached to an opposite end of the shaft.

10. The multi-socket power adapter according to claim 9, wherein said first plate comprises three concentric conductor rings formed thereon.

11. The multi-socket power adapter according to claim 10, wherein said circuit comprises:

a plurality of conductor lines for conducting power to said plug sockets; and a plurality of ball-point conductors disposed at select positions on the conductor lines, the ball-point conductors being in constant contact with the conductor rings to conduct power at any rotated position of said spool.

12. The multi-socket power adapter according to claim 11, wherein each said ball-point conductor comprises a cylinder base and a spherical ball rotatably mounted to one end of the cylinder base.

13. The multi-socket power adapter according to claim 1, further comprising a wall mount adapter for selective installation of the main housing unit to a wall.

14. The multi-socket power adapter according to claim 13, wherein said wall mount adapter comprises a substantially rectangular open box.

15. The multi-socket power adapter according to claim 14, further comprising at least one opening formed in the main housing unit for threading power lines therethrough.

* * * * *